Sept. 7, 1954

S. L. KOMARIK ET AL 2,688,555

MEAT-CURING PROCESS

Filed Sept. 4, 1952

Inventors
Stephan L. Komarik
Carroll L. Griffith by W. Bartlett Jones,
Attorney

Patented Sept. 7, 1954

2,688,555

UNITED STATES PATENT OFFICE 2,688,555

MEAT-CURING PROCESS

Stephan L. Komarik and Carroll L. Griffith, Chicago, Ill., assignors to The Griffith Laboratories, Inc., Chicago, Ill., a corporation of Illinois Application September 4, 1952, Serial No. 307,826

19 Claims. (Cl. 99—159)

The present invention relates generally to treating green animal body pieces and especially pork bellies to render them more readily curable and to curing processes therefor. It has particular reference to production of commercial bacon, but relates also to producing new and useful specialty bacon. The invention is applicable to all kinds of meats but is especially useful for fatty pieces, such as pork bellies, back fat and jowl.

The curing of meat products involves action upon the lean, rather than the fat, and conventionally it comprises subjecting the lean to the action of a salt composition including sodium chloride and nitrogen-containing curing salt which is usually a mixture of nitrite and nitrate of alkali metal. In many cases this is followed by smoking. In the case of fatty pieces of meat, such as pork bellies, back fat and jowl, the lean is hidden or buried by fat, calling for prolonged curing procedures in order to have the curing material pass through the fat to reach the lean. This is especially true in the commerical production of bacon. Bacon derives from pork bellies which are slab-like pieces having skin on one face and flesh and fat on the other face. The belly is largely fat but is streaked with layers of lean.

The present invention is most useful for the production of bacon, and it is herein specially illustrated by reference to its practice on pork bellies.

Heretofore bacon has been produced by salt curing and then smoking. The salt curing has been effected by two types of processes. One is the dry curing process in which curing salt is rubbed on the belly and allowed to stand in a chill room. The second method is to immerse the belly in pickling brine in a vat. The present invention relates to improvements in the dry process for curing any kind of meat, and especially fat pieces such as pork bellies.

Heretofore, the dry process as used for bacon has been practiced by rubbing a layer of curing composition over the surface of chilled green pork bellies, and stacking the treated bellies in a curing box, all at a chill temperature of 38° to 42° F. Such curing is carried out for a time period of about one day per pound weight of the pork belly. Low temperature is required in order to minimize spoilage or decomposition. Higher temperatures would lead to better flavor, but for the long time of standing, higher temperatures also lead to undesired decomposition.

The applied curing composition draws water from the belly forming a brine which diffuses through the fat and into the lean. One difficulty with the process is the slow rate of diffusion of the curing material into the belly, causing brine to drip from the top pieces toward the bottom pieces. This results in non-uniformity of salt content and of curing vertically in the stack. To minimize this defect, the amount of salt initially used is frequently decreased and the process is interrupted for a second application of salt to complete the cure.

Another defect in the process is the variability of cure between the surface layers of lean and the inner layers of lean. The surface layers are overcured and so long exposed to air and strong brine that they lead to an undesirable dark or even black color in the consumer product, generally non-uniform over the face of the slab.

Improvements in the procedure for producing bacon, primarily to shorten the time of the cure, have long been sought. One improved method which has been adopted involves the subjection of the pork belly to a bank of hollow injector needles which are connected to a supply of pickling brine. Many needles penetrate the bacon at points separated from each other by approximately one inch. When the needles are well within the body of the belly, brine under heavy pressure is forced into the needles and out through perforations in the needle walls near the tips. This process quickly introduces the required quantity of pickle liquor into the body of the piece at many small localized reservoirs of brine around the tips of the needles from which regions the pickle liquor diffuses to uniformity in shorter times than in the rubbing and pickling-bath procedures. A disadvantage of the multiple needle injection of brine is the disruption of the structure of the pork belly, and in particular a cleavage between the layers of lean and fat. The volume of pickle liquor introduced by each needle is in the neighborhood of 6 to 8 cubic centimeters. This volume introduced at heavy pressure requires the creation of a pocket within the belly to accommodate it. Pocket formation thus destroys the integral structure of the bacon and the destruction is evident after curing, smoking, and slicing, both in the market and the hands of the consumer.

Another deficiency of the dry-cure is the difficulty of introducing sugar for sugar-cured bacon. Sugar diffuses into the tissue much slower than salt, so that curing times must be prolonged to increase the sugar content of the bacon. In the long-time cures the main function is the introduction of curing nitrogen-containing salts for action on the lean. The sodium chloride which accompanies these salts acts as a preservative during processing. The more the time may be shortened, the less need there is for salt. Thus, in the shortened-cure of the present invention sodium chloride may be dispensed with, and sugar may be used or increased for flavor. Where the cured product is smoked for preservation, the present invention permits production of smoked sugar-cured bacon free from sodium chloride for use by those on a salt-free diet.

The present invention leads to a short-time cure for meat pieces, and especially pork bellies and other fat pieces, by making use of the desirable features of the needle-injection pickling, and the desirable features of the dry process curing, without the disadvantages of either process.

It is the general object of the invention to treat curable pieces mechanically so as to provide a multiplicity of artificial pores from the exterior to the interior for entry of any desired treating liquid for diffusion of the treating material from the pore into the piece.

It is a particular object of the invention to shorten the time of dry-cures by forming a multiplicity of temporary artificial pores in the piece to be cured, and then applying solid water-soluble curing material, thereby to shorten the paths for diffusion of the resulting dissolved curing material.

A particular object of the invention is to pierce the piece to be cured at a multiplicity of locations with a pin in a manner and under conditions such that upon withdrawal of the pin and open artificial pore remains, at least for a time to function in one or more of the curing steps.

Another and particular object of the invention is to so form an open artificial pore that it will close toward the final processing of the piece and leave no evidence of its former existence.

It is a particular object of the invention to form an ordered multiplicity of open artificial pores in pork bellies, and then to process the porous bellies by a single-step dry-cure of shortened duration followed by smoking for a shortened period, both compared to conventional and similar processing on like pieces without such pores.

Various other and ancillary objects and advantages of the invention will become apparent from the following description and explanation of the invention as it is more particularly applied to pork bellies and as illustrated by the accompanying drawings in which.

Figure 1:
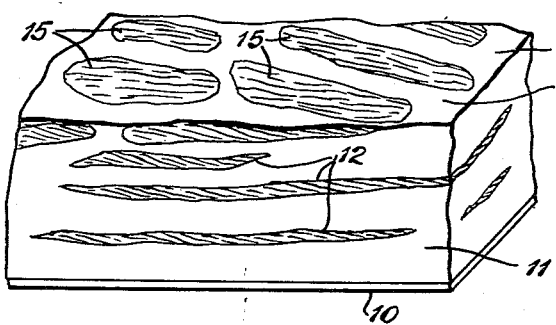
Fig. 1 is an end view of a cut slab of bacon showing a typical arrangement of fat and lean.
Figure 2:
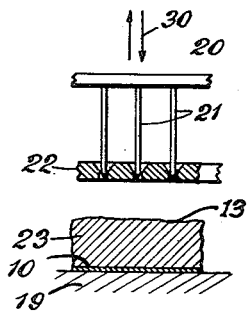
Figs. 2 through 5 represent the sequence of operations of a perforating press on a pork belly.
Figure 3:
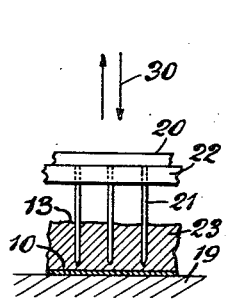

The present invention is based upon the discovery that a pointed pin of selected size, whether round, square, triangular or otherwise shaped, may be inserted into a green pork belly or other piece of meat, so that on withdrawal an opening remains, and further, that the opening may be of such small size that it will close when the piece has been cured and is being smoked. By the use of a pointed pin, there is no cutting action, and the ultimate effect is mechanically to crowd the material away from the space for the pore.

Whether or not a given size of pin will leave a hole on withdrawal depends not only on the kind of meat but also its temperature. In the case of green pork bellies a pin which is ⅛ inch in diameter leaves an open pore when the belly is chilled to 32° to 34° F. When the belly is about 40° F. and higher the hole left by such a pin closes. Consequently, the temperature and size of pin must be selected as experience dictates for the end results desired.

Although the perforated belly may be held for curing in a chill room at a temperature well above that at which the hole would close, if formed at the chill room temperature, it appears that the prompt application of curing composition to the still-porous chilled piece, hardens the surface of the pore or otherwise fixes the surrounding material so that the hole does not close by increase of temperature in curing. The pin is preferably chosen of a size so that the pore which it forms remains open after curing and in the initial steps of smoking, and closes on shrinkage during smoking.

When such a piece having an ordered multiplicity of pores is treated with the usual full amount of a solid soluble curing composition, more or less in the conventional manner, it has been found that the material more quickly dissolves in the water drawn from the belly and the resulting solution enters the belly through the pores, without the undesired run-off mentioned above in reference to dry-process curing of pork bellies. It was thus discovered that a pork belly with a certain pattern of pores made with pins of selected size may be uniformly cured with salt compositions in about 72 hours compared with the former practice of 10 to 14 days. It was also discovered that when these cured pieces are removed to a smoke house, the smoking may be more quickly accomplished, because smoke enters the belly through the open pores during the initial portion of smoking. As the temperature rises in the smoke house and the belly shrinks by loss of water, the shrinkage effects a closure of the pores with no evidence of their former existence when the product is sliced. As a result of the shortened time, it has also been found that the temperature for the curing may be higher than the conventional 38° to 42° F. for improved generation of flavor.

Accordingly, by the provision of numerous artificial pores and by control of the pattern for spacing such pores, the timing of a curing process may be controlled, and the curing temperature may be elevated above conventional practice.

The nature of the piece to be cured and other factors determine the size of the pin to be used in order that the pore remains open for the desired length of time, and in order that it closes in the processing before the cured piece reaches the consumer. In the case of pork bellies treated by the process hereinafter described, it has been found that a round needle having a diameter of approximately $\frac{3}{32}$ to ⅛ of an inch provides a pore which remains open during the salt cure and during the initial portion of the smoking, and which closes during the later part of the smoking, thereby to yield a smoked slab devoid of evidence of the pores. It is, therefore, to be understood that the size and shape of the needle is subject to variation according to the piece and the processing, and according to desire for avoiding evidence of the pores.

Fig. 1 represents a green pork belly. This has skin 10 on one face, a slab-like body of fat 11 variously streaked with layers of lean 12 and a so-called flesh side 13 which presents both fat 14 and lean 15. The lean is generally arranged in streaks comparable to the parallel arrangement of the ribs. In the conventional long-time dry-cure it is the lean areas 15 which tend to assume variable undesired dark brown to black colors.

Figs. 2 through 5 show more or less diagrammatically the action of a suitable mechanical device upon a slab of bacon. The diagrammatic showing is fragmentary and it is to be understood that the pins which are used are preferably arranged over an area sufficiently large to comprehend any size of pork belly. There is provided a horizontal platform or table 19 and above it a vertically movable plate assembly 20 in which are mounted downwardly projecting vertical parallel pins 21, preferably positioned as on the corners of ¾ inch squares. The pins 21 are preferably circular in cross-section and pointed at the end, and the ends of all the pins are in a common plane. A fixed horizontal stripper plate 22 is perforated for the pins 21 to move freely up and down therein. The stripper plate 22 is fixed above the table 19 on which a pork belly 23 is placed with its skin 10 on the table 19, under stripper plate 22, while the ends of the pins are within the faces of the stripper plate. Sufficient clearance is provided between the table 19 and the fixed plate 22 for receipt of any thickness of pork belly 23.

Figure 6:
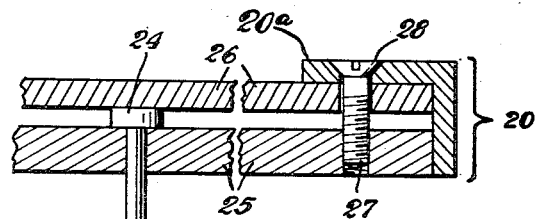
Fig. 6 is an enlarged fragmentary cross-sectional view of the press.

No particular structure for the press is essential. However, a structure adaptable for easily cleaning and repairing it is most desirable. A suitable form is shown in Fig. 6. Pins 21 may break or so bend that some need to be replaced. Each pin is removable. It has a flat head 24, held between two plates 25 and 26, the edges of which are mounted in an angle iron 20a which completes the plate assembly 20. Screw 27 which passes freely through plate 26 and is threaded into plate 25, has a flat head 28 in a countersunk opening in angle iron 20a. Stripper plate 22 has a counter-sunk cylindrical hole 29 closely fitting the pin 21 to steady and guide it, the bevelled wall assisting in assembly of the parts.

Figure 4:
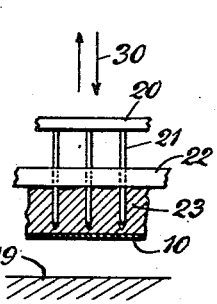
Figure 5:
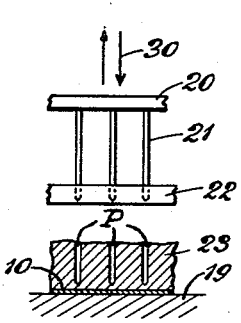

When a belly 23 is placed in the press, the movable plate assembly 20 is lowered under pressure, preferably pneumatic pressure, by raising and lowering means not shown and indicated by the double arrows 30, so that the pins 21 do not pass through the skin 10. Preferably the pins 21 are arrested at a distance above the skin, not greater than the spacing between the pins. Such arrest may be accomplished by the plates 25 and 22 coming together. The pins are immediately withdrawn as by pneumatically lifting the plate assembly 20 as shown in Fig. 4. The adherence of the pins to the pork belly raises the belly raises the belly from the table 19 against the stripper plate 22 until the weight overcomes pin friction, thus causing the slab to drop to the table 19 with the pins removed, as shown in Fig. 5, leaving a multiplicity of artificial pores P terminating just above the bottom of the belly 23. The perforated belly is removed and a new one entered for a like operation. A conveyer belt may bring the bellies to the press, halt, and then remove the perforated belly. As much as 40,000 pounds of belly may be thus treated in single file in about seven hours, even by manually feeding the press.

Figure 7:
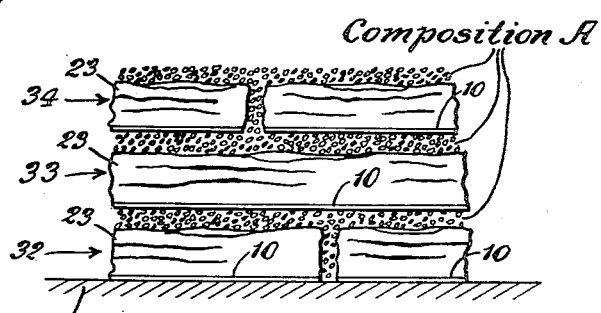
Fig. 7 represents the manner in which the perforated bellies covered with curing composition are vertically stacked, employing the bottom skin face of each belly as a partition to exclude the underlying composition intended for the belly on which it is spread.

Immediately the perforated bellies 23 are treated and stacked vertically in piles on a clean surface without need for the conventional bacon curing box to catch dripping brine. As each slab is placed skin side down on the pile there is sprinkled over its porous face a dry solid mixture of curing composition in predetermined amount according to the weight of the slab. Over the sprinkled composition is then placed the skin of another slab. The piles are held for about three days, and within a few hours it may be seen that the salt composition is liquifying and disappearing. The composition draws water from the belly and the resulting solution runs into the open pores, and from there diffuses quickly into the slab. The maximum distance through which the liquid must diffuse is merely the half-way distance between the pores, making it clear that the time period for the cure may be controlled by the spacing of the pores. The skin side, when preferably but not necessarily unperforated, is an effective partition to prevent an upper piece taking up curing composition applied to and intended for a lower piece. The rapid consumption of the material prevents run-off of solution, with the result that the processing is clean and all the stacked pieces are uniformly treated. Fig. 7 illustrates the stacking of bellies for curing. Any clean platform 31 receives a first lay 32 of bellies 23 with skin 10 down. On each belly is spread a curing material such as composition A in predetermined proportion of the weight of the belly. Then on top of composition A is placed a second lay 33 of like bellies, skin-side down, with their perforated faces likewise covered with curing material, and so on to more lays such as lay 34.

In the case of 12 to 14 pound bellies perforated at below 40° F. with needles ⅛ inch in diameter on ¾-inch centers, held in a chill room at 46° to 48° F., and with the use of 3 to 5 pounds of curing salt A (hereinafter defined) per 100 pounds of belly, the slabs are uniformly cured in 72 hours. The cured slabs exhibit the artificial pores at the end of the 72 hours. Because the faces of the slab are still wet with concentrated brine, each slab is given a slight wash with water to cleanse it from excessive salt at the surfaces. Then the slab is hung in a smoke house and smoked in a conventional manner but in shorter time.

Among the curing materials which may be used are:

Composition A:
    Sodium chloride_____ pounds__ 12
    Granulated cane sugar_____ do____ 8
    Sodium nitrite_____ ounces__ 3
    Sodium nitrate_____ do____ 2

Composition B:
    Granulated cane sugar_____ pounds__ 20
    Potassium nitrate_____ ounces__ 8
    Potassium nitrite_____ do____ 1

Composition C:
    Sodium chloride_____ pounds__ 12
    Granulated cane sugar_____ do____ 8
    Sodium nitrite_____ ounces__ 1
    Sodium nitrate_____ do____ 8

It is to be understood that the pin size is not critical except as it may be so for any given desires and conditions, including the temperature of the piece when the pin is inserted. Likewise, the curing materials are not critical, nor are the times and temperatures, except for any given desires and conditions. Curing times may be shortened and curing temperatures may be raised because of the shortened time to complete the diffusion of curing material into the meat product. The shortening of the time is dependent upon the pattern of the artificial pores and that is not critical.

Some dry-cures of bacon are carried out on green bellies from which the skin has been removed, thus to hasten absorption of curing material from both faces of the belly. Although the present invention may be carried out on such bellies, it is preferred to leave the skin as a partition to exclude from each belly the underlying curing material intended for and thus available only for the belly on which it lies. By this preferred practice uniformity of cure is assured.

Accordingly, the illustrative details above given and set forth in the accompanying examples are not to be considered as limiting the invention.

*Example 1.*—Chilled green pork bellies at less than 40° F. are subjected to a bank of needles of ⅛ inch diameter on ¾ inch spacing, all as described, to form pores terminating just above the skin. Then in proportion of 3 to 5 pounds of composition A to 100 pounds of belly, the curing material is spread on the top of each belly as vertically stacked skinside down. Standing for approximately 72 hours at 46° to 48° F. the bellies are cured. They are then washed with tap water to remove excess salt from the surface and hung in a smoke house.

Smoke houses are normally maintained at 135° F. The chilled bellies taken directly from the curing above described and at any temperature up to about 50° F. are hung and smoked until an internal temperature of 125° to 127° F. is obtained, taking normally about 8 hours. The smoked bacon is then returned to a chill room in those establishments where it is chilled, pressed to shape, sliced and packaged.

*Example 2.*—Chilled pork butts at a temperature below 40° F. are subjected to a bank of penetrating pins of ⅛ inch diameter with ¾ inch spacing, and of lengths insufficient to pass through the butt. Then composition A or C in the amount from 3 to 5 pounds per 100 pounds of butt is rubbed over the porous surfaces and the butts are packed tightly in a tierce for curing in a period of 5 to 6 days, compared to conventional curing without such pores in 21 to 26 days. The cured pieces are stuffed whole in casings and smoked in the conventional way as in Example 1, forming Cappicola.

*Example 3.*—*Salt-Free Bacon.* Chilled green pork bellies at less than 40° F. are subjected to penetration as in Example 1, with needles ⅛ inch in diameter on ¾ inch spacing, without piercing the skin. Then an amount in the range from 3 to 5 pounds of composition B to 100 pounds of bellies is spread over the porous side of the bellies and the bellies stacked as described in a chill room at 46° to 48° F. for approximately 72 hours. They are then washed and smoked as in Example 1, and may be chilled, sliced and packaged as salt-free bacon for those on salt-free diets.

The present invention in its broadest aspect, is not limited to dry curing. The open pores are also useful in vat cures, as in normal chill-room vat curing, and also in specialized vat cures. The cold-vat curing time is greatly shortened by the quickened diffusion through the open pores. Otherwise, the processing may be conventional.

When the artificially porous pieces, and especially the pork bellies are immersed each in isolated position in a circulating brine at 110° to 135° F. as described in Komarik and Hall U. S. Patent No. 2,553,533, the time of curing may be greatly shortened from the 5 to 10 hour pickling period therein described for pork bellies not made artificially porous.

It is therefore to be understood that the process may be carried out in numerous ways falling within the scope of the appended claims.

We claim:

1. The method which comprises forming multiple artificial pores in a chilled green edible animal body piece to be cured by mechanically crowding the material of the piece away from the space for each pore, whereby to leave open pores into the piece, spreading water-soluble meat-processing material over the artifically porous surface of the chilled piece, maintaining the treated piece in its chilled condition, whereby the treating material dissolves in water from the piece and diffuses into the piece via said pores, and then smoking and raising the temperature of the treated piece for partial dehydration, whereby smoke initially enters the pores and the pores eventually close with shrinkage of the piece.

2. The method which comprises forming multiple artificial pores in a chilled green pork belly by mechanically crowding the material of the piece away from the space for each pore, whereby to leave open pores into the belly, spreading water-soluble meat-processing material over the artificially porous surface of the chilled belly, maintaining the treated belly in its chilled condition, whereby the treating material dissolves in water from the belly and diffuses into the belly via said pores, and then smoking and raising the temperature of the treated belly for partial dehydration, whereby smoke initially enters the pores and the pores eventually close with shrinkage of the resulting cured belly.

3. The method which comprises forming multiple artificial pores in a chilled green pork belly having skin on one face thereof by mechanically crowding the material of the piece way from the space for each pore, said space extending from the face of the belly opposite the skin to a region within the outer face of the skin, whereby to leave open pores into the belly, spreading water-soluble meat-processing material over the artificially porous face of the chilled belly, stacking a plurality of such chilled so-covered bellies skin-side down, maintaining the stacked bellies in their chilled condition, whereby the treating material dissolves in water from the belly and diffuses into the belly via said pores, and then smoking and raising the temperature of the treated bellies for partial dehydration, whereby smoke initially enters the pores and the pores eventually close with shrinkage of the resulting cured product.

4. The method which comprises forming multiple artificial pores in a chilled green pork belly having skin on one face thereof by mechanically crowding the material of the piece away from the space for each pore, said space extending from the face of the belly opposite the skin to a region within the outer face of the skin, whereby to leave open pores into the belly, spreading over the artificially porous face of the chilled belly a comminuted curing composition comprising sodium chloride and nitrogen-containing curing salt of alkali metal, stacking a plurality of such chilled so-covered bellies skin-side down, maintaining the stacked bellies in their chilled condition, whereby the curing composition dissolves in water from the belly and diffuses into the belly via said pores, and then smoking and raising the temperature of the treated bellies for partial dehydration, whereby smoke initially enters the pores and the pores eventually close with shrinkage of the resulting product.

5. In the curing of edible body pieces the improvement which comprises forming multiple artificial pores in a chilled piece by mechanically crowding the material of the piece away from the space for each pore, whereby to leave open pores into the piece, spreading water-soluble meat-processing material over the artificially porous surface of the chilled piece, and maintaining the treated piece in its chilled condition, whereby the treating material dissolves in water from the piece and diffuses into the piece via said pores.

6. In the curing of edible fatty animal body pieces having lean portions adjacent fat, the improvement which comprises forming multiple artificial pores in a chilled piece by mechanically crowding the material of the piece away from the space for each pore, whereby to leave open pores into the piece, spreading water-soluble meat processing material over the artificially porous surface of the chilled piece, and maintaining the treated piece in its chilled condition, whereby the treating material dissolves in water from the piece and diffuses into the belly via said pores.

7. The method of curing the lean of meat which comprises forming in a chilled piece of meat having lean a multiplicity of temporary open pores by mechanically crowding the material of the piece away from the space for each pore, the size of each pore being such that it remains open during the hereinafter-mentioned curing of the piece and such that it closes on subsequent shrinkage of the resulting cured piece, subjecting the porous surface of the chilled piece to contact with solid water-soluble curing material whereby the juices of the meat dissolve said material and the resulting solution diffuses into the piece via said pores, and thereafter partially dehydrating the piece at least to the point of closing said pores.

8. The method of curing the lean of meat which comprises forming in a chilled piece of meat having lean a multiplicity of temporary open pores by mechanically crowding the material of the piece away from the space for each pore, the size of each pore being such that it remains open during the hereinafter-mentioned curing of the piece and such that it closes on subsequent shrinkage of the resulting cured piece, subjecting the porous surface of the chilled piece to contact with solid water-soluble curing material whereby the juices of the meat dissolve said material and the resulting solution diffuses into the piece via said pores, and thereafter smoking and shrinking the piece at least to the point of closing said pores.

9. The method of curing the lean of meat which comprises forming in a chilled piece of meat having lean a multiplicity of open pores by mechanically crowding the material of the piece away from the space for each pore, the size of the pore being such that it remains open during the hereinafter-mentioned curing of the piece, and subjecting the porous surface of the chilled piece to contact with solid water-soluble curing material whereby the juices of the meat dissolve said material and the resulting solution diffuses into the piece via said pores.

10. The method of curing the lean of meat which comprises forming in a chilled piece of meat having lean a multiplicity of open pores by mechanically crowding the material of the piece away from the space for each pore, each pore having a closed inner end and being of size such that it remains open during the hereinafter-mentioned curing of the piece, and subjecting the porous surface of the chilled piece to contact with solid water-soluble curing material whereby the juices of the meat dissolve said material and the resulting solution diffuses into the piece via said pores.

11. The method of curing the lean of a green pork belly which comprises forming in a chilled belly a multiplicity of open pores by mechanically crowding the material of the piece away from the space for each pore, the size of the pore being such that it remains open during the hereinafter-mentioned curing of the piece, and subjecting the porous surface of the chilled belly to contact with solid water-soluble curing material whereby the juices of the belly dissolve said material and the resulting solution diffuses into the belly via said pores.

12. The method of curing the lean of a green pork belly which comprises forming in a chilled belly a multiplicity of open pores by mechanically crowding the material of the piece away from the space for each pore, each pore having a closed inner end and being of size such that it remains open during the hereinafter-mentioned curing of the piece, and subjecting the porous surface of the chilled belly to contact with solid water-soluble curing material whereby the juices of the belly dissolve said material and the resulting solution diffuses into the piece via said pores.

13. In the preparation of edible meat products by subjecting a piece of meat to contact with water-soluble meat-processing material for affecting the piece, the improvement which comprises forming a multiplicity of open pores from the exterior to the interior of a green piece of meat by mechanically crowding the material of the piece away from the space for each pore, the size of the pore being such that it remains open for use as a channel for entry of a solution of said water-soluble material.

14. In the preparation of bacon by subjecting a pork belly to contact with water-soluble meat-processing material for affecting the piece, the improvement which comprises forming a multiplicity of open pores from the exterior to the interior of a chilled pork belly by mechanically crowding the material of the piece away from the space for each pore, the size of the pore being such that it remains open for use as a channel for entry of a solution of said water-soluble material.

15. In the preparation of bacon by subjecting a green pork belly having a skin face and a flesh face to contact with water-soluble meat-processing material for affecting the piece, the improvement which comprises forming a multiplicity of open pores from the flesh face to the interior of a green pork belly by mechanically crowding the material of the piece away from the space for each pore and to a depth for the pore short of penetrating the skin, the size of the pore being such that it remains open for use as a channel for entry of a solution of said water-soluble material.

16. In the preparation of bacon by subjecting a green pork belly having a skin face and a flesh face to contact with water-soluble meat-processing material for affecting the piece, the improvement which comprises forming a multiplicity of open pores from the flesh face to the interior of a green pork belly by mechanically crowding the material of the piece away from the space for each pore and to a depth for the pore short of penetrating the skin, the size of each pore being sufficiently large so that it remains open for use as a channel for entry of a solution of said water-soluble material, and sufficiently small so that on shrinkage of the resulting treated belly during smoking the said opening closes.

17. The method of curing green edible meat pieces which comprises forming artificial pores in a piece of meat by mechanically crowding the material of the piece away from the space for each pore at a multiplicity of locations, the temperature of the piece and the size of each pore both being so related that the pore remains open in the chilled condition of the piece, and subjecting the porous piece to the action of dissolved curing material in contact with the piece at the walls of the open pores, whereby diffusion of the curing material to substantial uniformity within the piece is accomplished in shorter time than where contact of such curing material is limited to the exterior surfaces of such a piece lacking like pores.

18. The method of curing green edible pieces of meat including pork bellies, back fat and jowl, which comprises forming artificial pores in a piece of meat by mechanically crowding the material of the piece away from the space for each pore at a multiplicity of locations, the temperature of the piece and the size of each pore both being so related that the pore remains open, and immersing the porous piece in a curing liquid, whereby the liquid enters the pores and diffuses therefrom into the piece.

19. The method of claim 12 in which the solid curing material is substantially lacking in a compound of sodium and comprises sugar and potassium nitrite, followed by smoking and shrinking the resulting cured product.

References Cited in the file of this patent

UNITED STATES PATENTS

| Number | Name | Date |
|---|---|---|
| 1,124,851 | Burkle | Jan. 12, 1915 |
| 2,528,204 | Zwosta | Oct. 31, 1950 |
| 2,553,533 | Komarik et al. | May 15, 1951 |